US012731746B2

(12) United States Patent
Zhong, Sr. et al.

(10) Patent No.: US 12,731,746 B2
(45) Date of Patent: Sep. 8, 2026

(54) MAGNETIC LATCHING RELAY WITH MICROSWITCH

(71) Applicant: Xiamen Hongfa Electric Power Controls Co., Ltd., Xiamen (CN)

(72) Inventors: Shuming Zhong, Sr., Xiamen (CN); Guojin Liao, Xiamen (CN); Wenguang Dai, Xiamen (CN); Fangneng Li, Xiamen (CN)

(73) Assignee: Xiamen Hongfa Electric Power Controls Co., Ltd., Xiamen (CN)

( * ) Notice: Subject to any disclaimer, the term of this patent is extended or adjusted under 35 U.S.C. 154(b) by 771 days.

(21) Appl. No.: 17/768,347

(22) PCT Filed: Jul. 22, 2020

(86) PCT No.: PCT/CN2020/103607

§ 371 (c)(1),
(2) Date: Jan. 30, 2024

(87) PCT Pub. No.: WO2021/073189

PCT Pub. Date: Apr. 22, 2021

(65) Prior Publication Data

US 2024/0128037 A1 Apr. 18, 2024

(30) Foreign Application Priority Data

Oct. 15, 2019 (CN) ........................ 201910979424.X

(51) Int. Cl.
*H01H 50/54* (2006.01)
*H01H 50/08* (2006.01)
(Continued)

(52) U.S. Cl.
CPC ............ *H01H 50/18* (2013.01); *H01H 50/08* (2013.01); *H01H 50/545* (2013.01); *H01H 50/64* (2013.01); *H01H 51/01* (2013.01)

(58) Field of Classification Search
CPC ..... H01H 50/64; H01H 50/545; H01H 71/465
(Continued)

(56) References Cited

U.S. PATENT DOCUMENTS 4,430,579 A * 2/1984 Wiktor .................. H01H 50/32 307/134
5,107,236 A * 4/1992 Lesslie ................ H01H 71/128 335/17
(Continued)

FOREIGN PATENT DOCUMENTS

CN 203367173 U 12/2013
CN 105280440 A 1/2016
(Continued)

OTHER PUBLICATIONS

CN201910979424.X—Notice of Allowance with English Translation.
(Continued)

*Primary Examiner* — Alexander Talpalatski
(74) *Attorney, Agent, or Firm* — Thomas Horstemeyer, LLP

(57) ABSTRACT

A magnetic latching relay with a microswitch, including an insulation case and a microswitch, the insulation case is formed by a base and a cover being fixedly connected, an armature assembly is pivotally connected on the base, the base is provided with an assembly zone for accommodating the microswitch at a position close to the armature assembly, the housing of the microswitch is abutted on the bottom of the assembly zone and is positioned by the assembly zone, a portion of the housing close to the armature assembly is suspended, the space below the portion gives way to the movement of the armature assembly and/or the push card, the cover is pressed the housing; the armature assembly is provided with a pressure rod extending toward the cover, and the pressure rod is pressed or released a trigger spring
(Continued)

sheet of the microswitch when the armature assembly is rotated.

20 Claims, 12 Drawing Sheets

(51) Int. Cl.
*H01H 50/18* (2006.01)
*H01H 50/64* (2006.01)
*H01H 51/01* (2006.01)

(58) Field of Classification Search
USPC .......................................................... 335/129
See application file for complete search history.

(56) References Cited

U.S. PATENT DOCUMENTS 8,203,403 B2 * 6/2012 Moeller ............. H01H 51/2227 335/78
9,159,515 B2 * 10/2015 Iwamoto ................ H01H 51/22
9,305,718 B2 * 4/2016 Iwamoto .................. H01H 1/50
9,620,310 B2 * 4/2017 Nguyen ............... H01H 71/465
9,799,475 B2 10/2017 Song
9,916,954 B2 * 3/2018 Helmreich ............. H01H 50/58
2017/0148598 A1 * 5/2017 Chen .................. H01H 51/2236
2019/0287749 A1 * 9/2019 Zhong .................... H01H 50/16

FOREIGN PATENT DOCUMENTS

| | | | |
|---|---|---|---|
| CN | 207705124 | U | 8/2018 |
| CN | 109559936 | A | 4/2019 |
| CN | 209087728 | U | 7/2019 |
| CN | 110610834 | A | 12/2019 |
| CN | 210403610 | U | 4/2020 |
| DE | 1464719 | A1 | 12/1968 |
| GB | 1046547 | A | 10/1966 |
| JP | 2012517092 | A | 7/2012 |
| JP | 2012517093 | A | 7/2012 |
| WO | 2010090619 | A2 | 8/2010 |
| WO | 2016129133 | A1 | 8/2016 |

OTHER PUBLICATIONS

Extended European Search Report dated Oct. 4, 2023 in co-pending European Patent Application No. 20877395.2.
International Search Report for PCT/CN2020/103607 mailed Sep. 28, 2020.
Japanese First Office Action mailed Apr. 4, 2023 in co-pending Japanese Patent Application No. 2022-522699.

* cited by examiner

MAGNETIC LATCHING RELAY WITH MICROSWITCH

CROSS REFERENCE

This present disclosure is a national phase entry under 35 U.S.C. § 371 of International Application No. PCT/CN2020/103607, filed on Jul. 22, 2020, which claims priority to Chinese Patent Application No. 201910979424.X, titled “MAGNETIC LATCHING RELAY WITH MICRO-SWITCH”, filed on Oct. 15, 2019. The entire contents of both applications are hereby incorporated herein by reference.

TECHNICAL FIELD

The present disclosure relates to the technical field of manufacture of magnetic latching relays, and in particular, to a magnetic latching relay with a microswitch.

BACKGROUND

The magnetic latching relay is a new type of relay developed in recent years, and it is also an automatic switch. Like other electromagnetic relays, the magnetic latching relay can automatically switch on or switch off the circuit. The difference is that the normally closed state or the normally open state is completely dependent on the permanent magnet, the switching of its closed and open states is accomplished by triggering a pulsed electrical signal with a certain width.

In order to judge whether the movable contact and the stationary contact of the magnetic latching relay are in a closed state or in a separated state, some magnetic latching relays in the related art are provided with microswitches, so that the state of the movable contact and the stationary contact can be judged by the closing or opening of the contacts of the microswitch. However, due to the addition of the microswitch, the volume of the case of the magnetic latching relay is increased, and the difficulty of arranging the magnetic latching relay with the microswitch on the electrical equipment is also increased.

SUMMARY

According to one aspect of the present disclosure, a magnetic latching relay with a microswitch is provided, the magnetic latching relay includes an insulation case and a microswitch, the insulation case is formed by a base and a cover being fixedly connected, a magnetic circuit system, a push card and a contact system are installed on the base; the magnetic circuit system includes an armature assembly, a middle portion of the armature assembly is pivotally connected to the base; the contact system includes a movable contact and a stationary contact, the armature assembly is connected with the push card, and the armature assembly is configured to drive the movable contact of the contact system through the push card to make the movable contact and the stationary contact be closed or separated from each other; where, the base is provided with an assembly zone for accommodating the microswitch at a position close to the armature assembly, a housing of the microswitch is configured to abut on a bottom of the assembly zone and be positioned by the assembly zone, a portion of the housing of the microswitch at a side close to the armature assembly is suspended, a space below the portion of the housing of the microswitch suspended is configured to give way to a movement of at least one of the armature assembly and the push card, the cover is fixed on the base, and the cover is configured to press the housing of the microswitch; one end of the armature assembly is provided with a pressure rod extending toward a side where the cover is located, and the pressure rod is configured to press a trigger spring sheet of the microswitch or release the trigger spring sheet of the microswitch in case that the armature assembly is rotated.

In some embodiments, the bottom of the assembly zone is provided with two positioning posts, the microswitch is installed in the assembly zone, each of the positioning posts is inserted into an installation hole of the microswitch; the two positioning posts and the pressure rod are parallel to each other.

In some embodiments, each of the positioning posts comprises a cylinder, a plurality of positioning protrusions protruding radially are provided on an outer peripheral surface of the cylinder at intervals along a circumferential direction of the cylinder, and each of the positioning protrusions is in a shape of a strip and is configured to extend along an axial direction of the cylinder.

In some embodiments, a limit post for limiting a movement of the housing of the microswitch is provided at the bottom of the assembly zone and adjacent to one of the positioning posts.

In some embodiments, a distance between a bottom surface of the housing of the microswitch and a bottom surface of the base is greater than a distance between an upper surface of an end portion of the push card connected to the armature assembly and the bottom surface of the base, so that one end of the push card is prevented from interfering with the microswitch during a movement of the push card.

In some embodiments, the bottom of the assembly zone is formed by an upper end surface of a convex block, and a side of the convex block close to the armature assembly is arranged as a stepped structure.

In some embodiments, an inner side of the cover is provided with a limit rib, the cover is fixed on the base, and the limit rib is pressed the housing of the microswitch.

In some embodiments, a plurality of conductive plug terminals of the microswitch are bent, and are extended through the cover, or extended through the base from a bottom.

In some embodiments, in case that the plurality of conductive plug terminals of the microswitch are bent and are extended through the base from the bottom, the conductive plug terminals are fixedly connected with a component for terminal extension, the component for terminal extension comprises an I-shaped frame, and both ends of the I-shaped frame are insulators, a plurality of conductive extension pins arranged at intervals are provided and are configured to extend through both ends of the I-shaped frame, the plurality of conductive plug terminals of the microswitch are inserted into one end of the I-shaped frame at intervals, each of the conductive plug terminals of the microswitch is in contact with one of the conductive extension pins; the base is provided with a through hole at the bottom of the assembly zone, the through hole is penetrated through the bottom of the base, the I-shaped frame is embedded in the through hole, and one end of each of the plurality of conductive extension pins is extended through the base.

In some embodiments, the contact system comprises two movable springs and two stationary springs, each of the movable springs is provided with the movable contact, and each of the stationary springs is provided with the stationary contact; there are two push cards, one end of each of the push cards is provided with a slot, each of the push cards is provided with a fitting hole which is under the slot, both ends of the armature assembly are provided with an engagement portion respectively, each engagement portion is fitted with the slot at one end of one push card and inserted into the fitting hole, another end of each of the push cards is connected to one end of one of the movable springs, another end of each of the movable springs are connected to a conductive lead-out pin.

In some embodiments, one end of the armature assembly is provided with a support part, and the support part is configured to extend to a side away from the microswitch, the pressure rod is disposed on one end of the support part away from the microswitch.

BRIEF DESCRIPTION OF THE DRAWINGS

The above and other features and advantages of the present disclosure will become more apparent from the detailed description of exemplary embodiments thereof with reference to the accompanying drawings.

DETAILED DESCRIPTION

Figure 1:
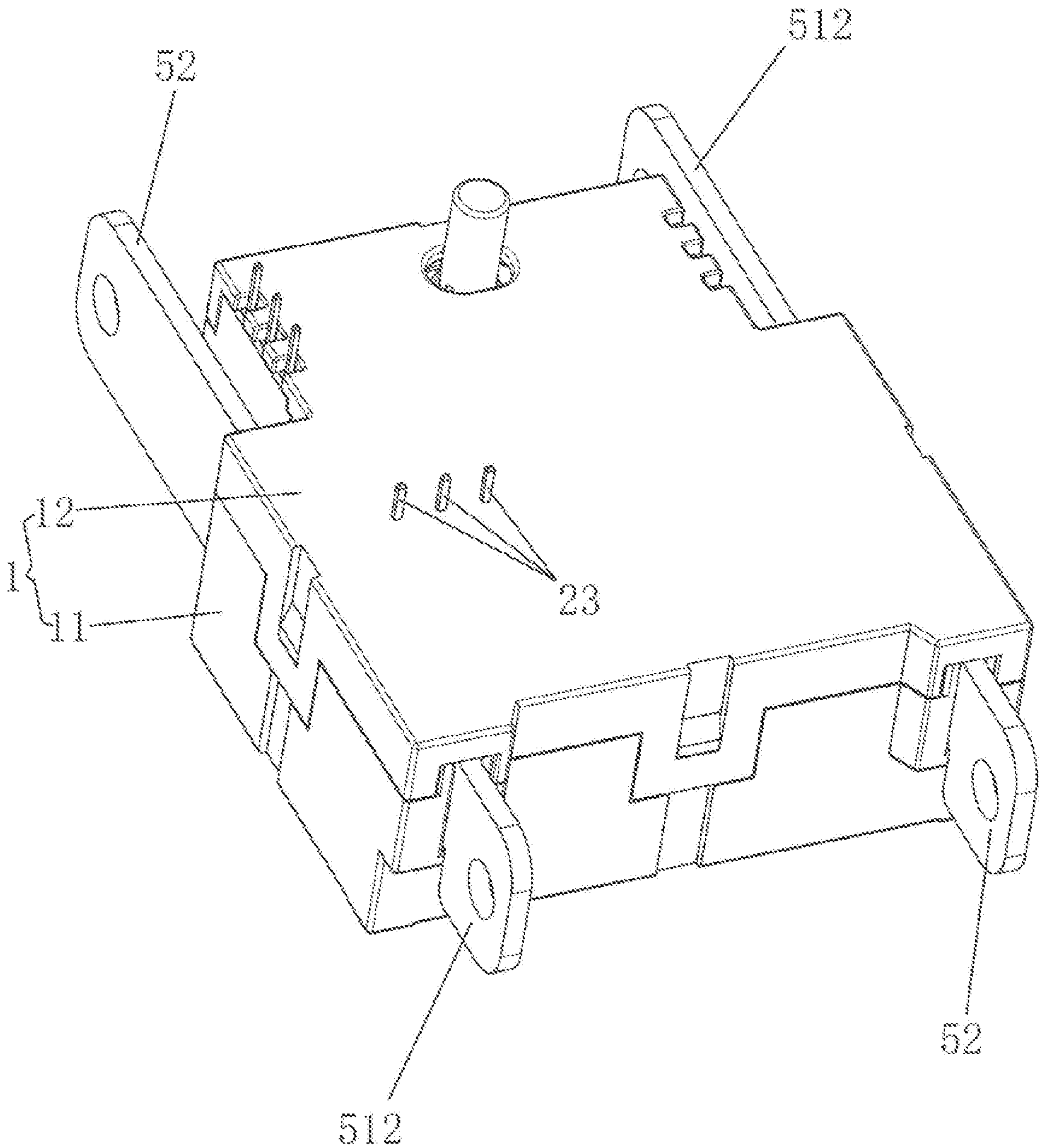
FIG. 1 is a top perspective view of a magnetic latching relay according to an exemplary embodiment of the present disclosure.

The present disclosure will be further described in detail below with reference to the accompanying drawings and specific embodiments.

The existing magnetic latching relay generally includes a plastic case, a plurality of conductive lead-out pins, a magnetic circuit system, a contact system, and a pushing mechanism. The plurality of conductive lead-out pins, the magnetic circuit system, the contact system and the pushing mechanism are all mounted on the plastic case. The magnetic circuit system usually includes a yoke, a coil, and an armature assembly. The contact system includes a movable spring and a stationary spring, the movable spring is provided with a movable contact, and the stationary spring is provided with a stationary contact. The pushing mechanism includes a push card, the armature assembly is connected to the push card, and the push card is connected to the movable spring part, the ends of the conductive lead-out pins in the case are fixedly connected with the movable spring and the stationary spring. When the positive pulse voltage is applied to the coil of the relay, the magnetic circuit system operates, the armature assembly drives the push card, and the push card pushes the movable spring to move, so that the movable contact is in contact with the stationary contact, and the relay is in a close state. When the reverse pulse voltage is applied to the coil of the relay, the magnetic circuit system operates again, the armature assembly drives the push card to return, and the push card pulls the movable spring back, and the movable contact is separated from the stationary contact to make the contacts be disconnected, and the relay is in an open state.

In order to judge whether the movable contact and the stationary contact of the magnetic latching relay are in a close state or in a separated state, some magnetic latching relays in the related art are provided with microswitches, so that the state of the movable contact and the stationary contact can be judged by the closing or opening of the contacts of the microswitch.

For example, a Chinese invention patent application with the patent number ZL201210198058.2 and the title "Magnetic latching relay with three closing forces that can monitor the opening and closing states of movable contact and stationary contact" was published on Oct. 3, 2012, in the patent application, the magnetic latching relay includes a case, a coil assembly, an armature assembly which can be rotated, a combined push card, a movable spring, a movable contact and a stationary contact. There is a compressed double spring behind the movable contact on the movable spring, the double spring is formed by connecting the steel wires at the bottom of two coil springs, there is also a "Z"-shaped pressure flexure sheet behind the movable contact on the movable spring, the upper part of the pressure flexure sheet is attached to the surface of the movable spring behind the movable contact, and the lower part is snapped into the combined push card. The upper surface of the combined push card is provided with a projection part, and a microswitch connected with the external display device is arranged on the case corresponding to the position of the projection part. The magnetic latching relay of the invention application has the function of monitoring the opening and closing states of the movable contact and the stationary contact, so that the external display device can display the closing or opening state. However, due to the addition of the microswitch, the volume of the case of the magnetic latching relay is increased, and the difficulty of arranging the magnetic latching relay with the microswitch on the electrical equipment is also increased.

Figure 2:
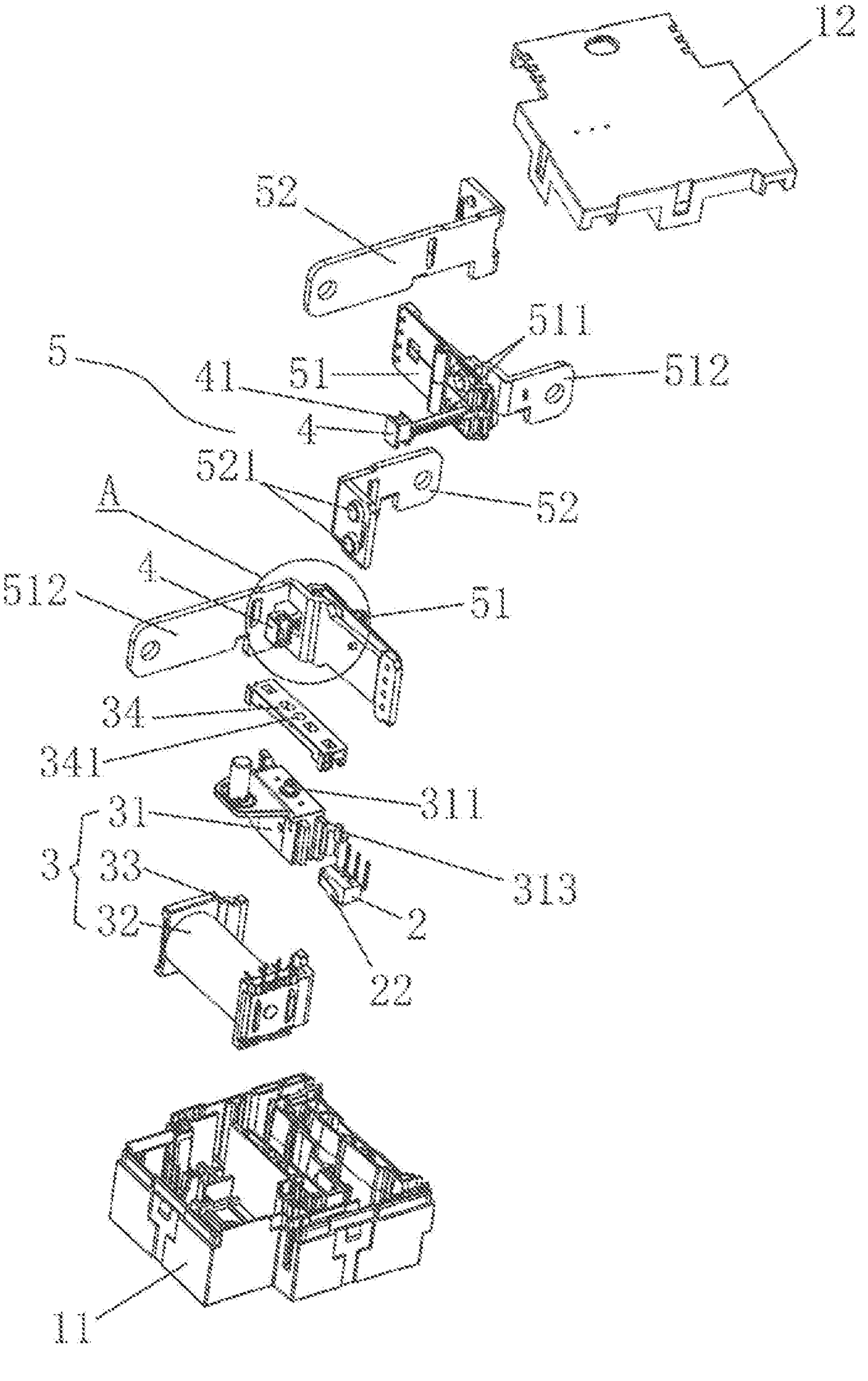
FIG. 2 is an exploded perspective view of a magnetic latching relay according to an exemplary embodiment of the present disclosure.
Figure 3:
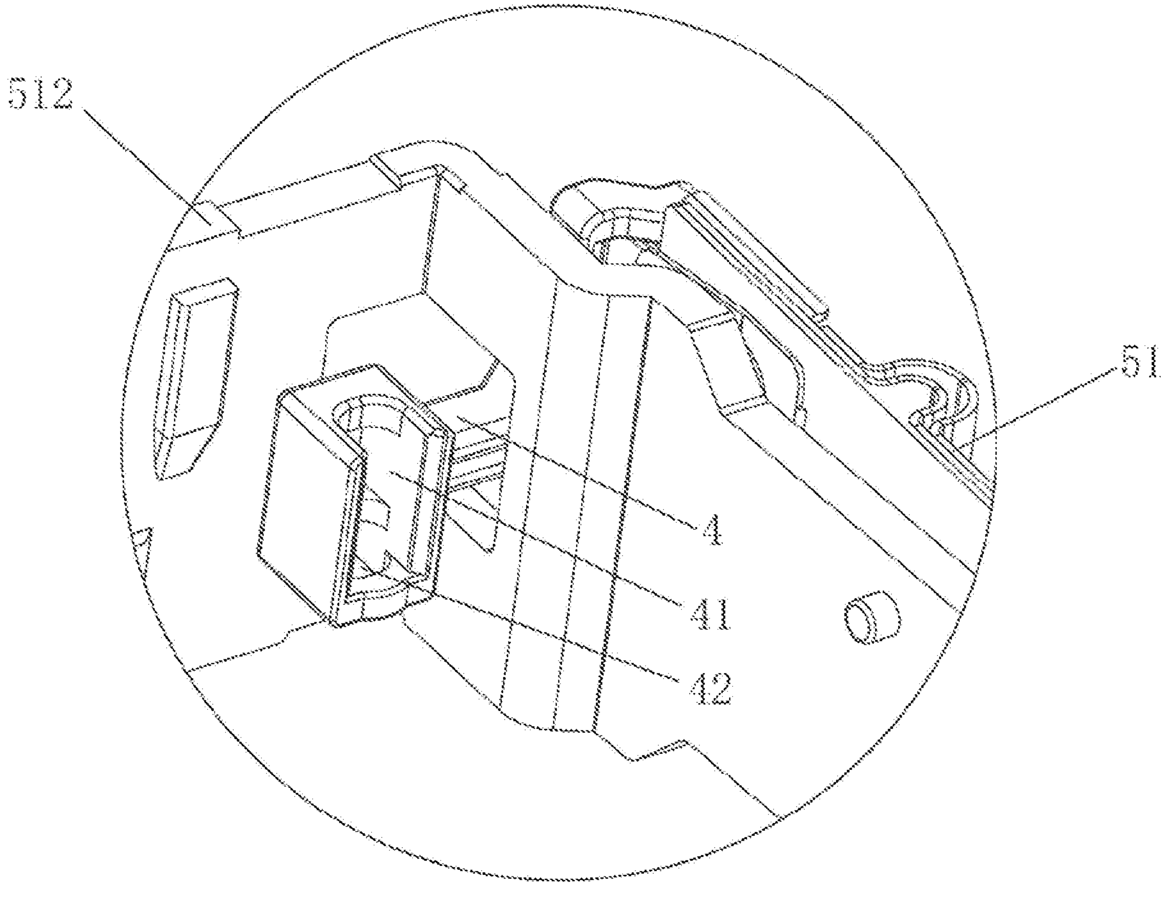
FIG. 3 is an enlarged view of part A of FIG. 2.
Figure 4:
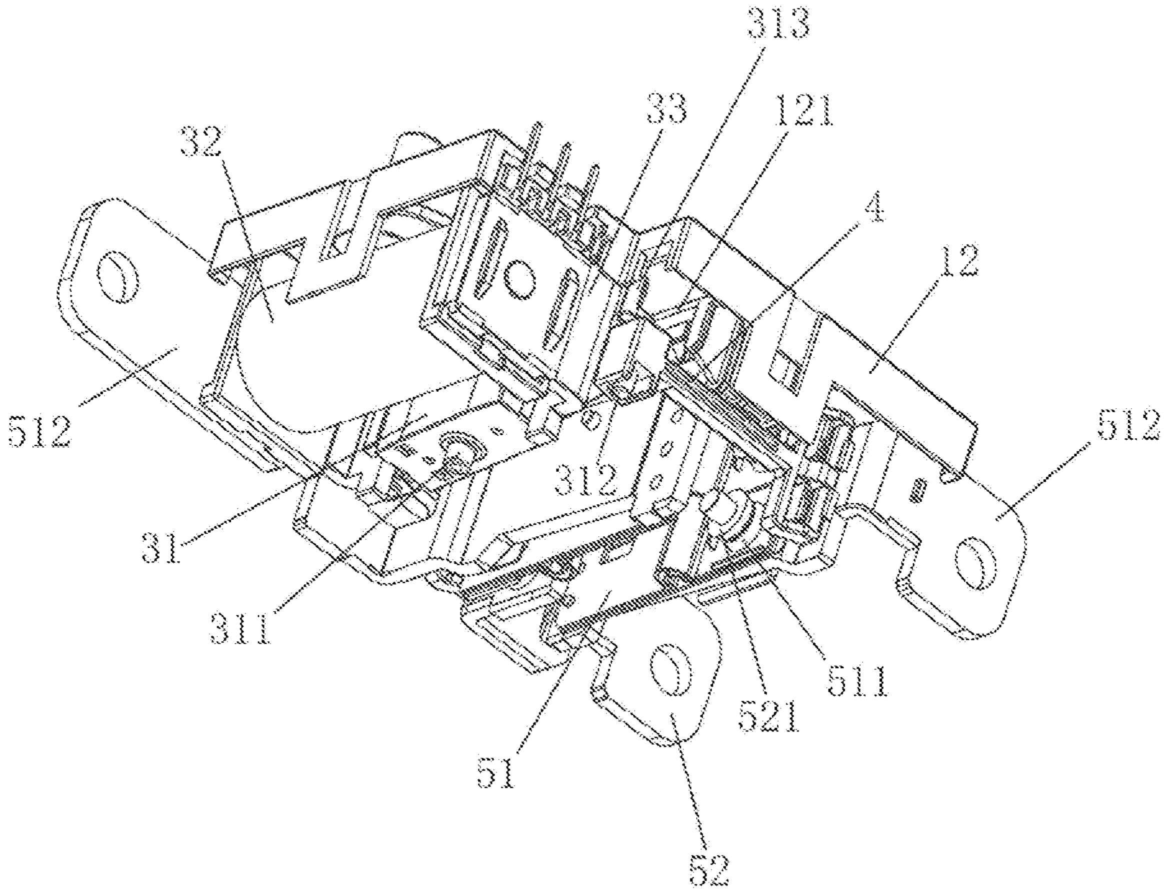
FIG. 4 is a bottom perspective view of the magnetic latching relay with the base, the microswitch and a stationary spring hidden according to an exemplary embodiment of the present disclosure.

Referring to FIG. 1 to FIG. 9, a magnetic latching relay with a microswitch is provided, the magnetic latching relay includes an insulation case 1 and a microswitch 2, the insulation case 1 is formed by a base 11 and a cover 12 being fixedly connected in a snap-fit manner. Both the base 11 and the cover 12 are made of plastic material by injection molding, and a magnetic circuit system 3, two push cards 4 and a contact system 5 are installed on the base 11, the magnetic circuit system 3 includes an armature assembly 31, a coil 32 and a yoke 33, the yoke 33 is fixedly connected to the bobbin, the coil 32 and the yoke 33 are fixed on one side of the base 11, as shown in FIG. 4, the middle portion of the armature assembly 31 is connected to the base 11 by pin joint and is beside the coil 32, at the middle position of the armature assembly 31, two pivot shafts 311 are provided and configured to extend outward from the upper and lower ends of the armature assembly 31 respectively. In other words, as shown in FIG. 2 and FIG. 4, the armature assembly 31 is provided with two pivot shafts 311, one of the pivot shafts 311 is configured to extend and protrude from the upper surface of the armature assembly 31 in a direction away from the upper surface, that is, the pivot shaft 311 mentioned above is configured to protrude upward from the upper surface; the other one of the pivot shafts 311 is configured to extend and protrude from the lower surface of the armature assembly 31 in a direction away from the lower surface, that is, the pivot shaft 311 mentioned above is configured to protrude downward from the lower surface; the central axes of the two pivot shafts 311 are overlapped with each other, one pivot shaft 311 is inserted into the pivot hole 111 (as shown in FIG. 3), the other pivot shaft 311 is fitted with a socket hole 341 of a pressure block 34 (as shown in FIG. 2), both ends of the pressure block 34 are fixedly connected with the base 11. The armature of the armature assembly 31 is configured to cooperate with the yoke 33 to move.

Figure 7:
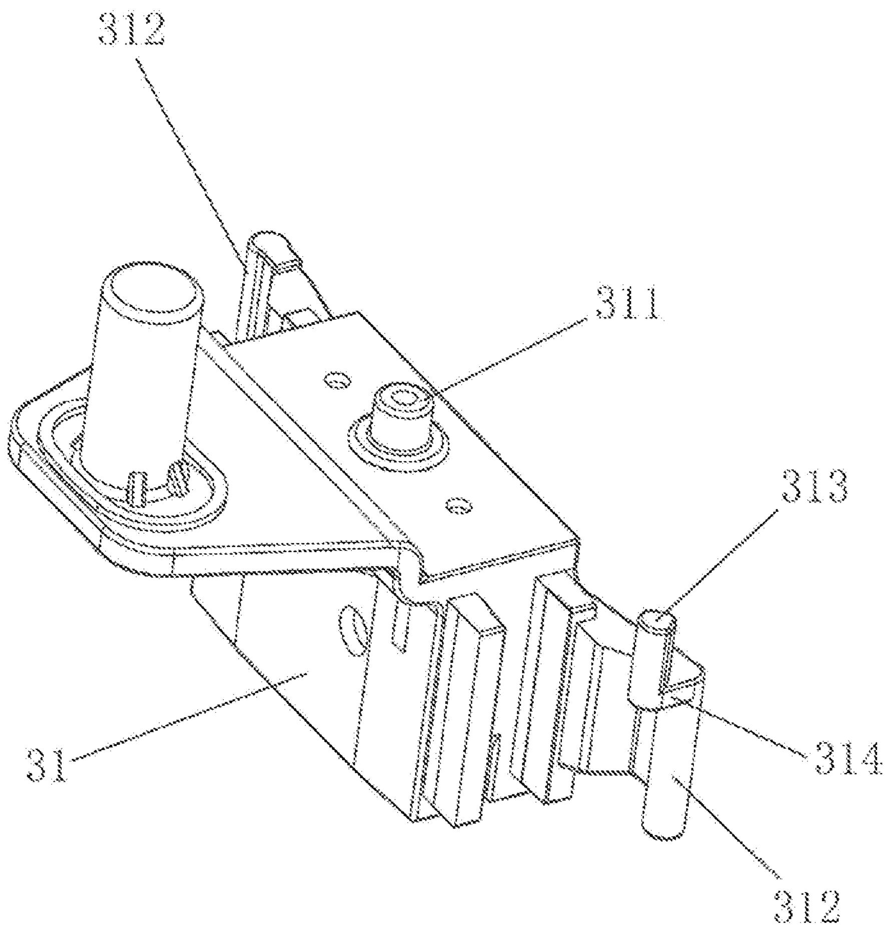
FIG. 7 is a perspective view of an armature assembly according to an exemplary embodiment of the present disclosure.

As shown in FIG. 2, the contact system 5 includes two movable springs 51 and two stationary springs 52, the two movable springs 51 have the same structure and each of the both is provided with two movable contacts 511, the structures of the two stationary springs are different, the specific structures are shown in FIG. 2, each stationary spring 52 is provided with two stationary contacts 521. As shown in FIG. 2 and FIG. 3, there are two push cards 4, one end of each push card 4 is provided with a slot 41, the push card 4 is further provided with a fitting hole 42 which is provided under the slot 41, as shown in FIG. 7, both ends of the armature assembly 31 are provided with an engagement portion 312 respectively, the engagement portion 312 is generally a cylinder, each engagement portion 312 is fitted with a slot 41 at one end of the push card 4 and inserted into the fitting hole 42, the other end of each push card 4 is connected to one end of one movable spring 51, the other end of the movable spring 51 is connected to a conductive lead-out pin 512; the structure of the conductive lead-out pin 512 connected to one movable spring 51 is different from the structure of the conductive lead-out pin 512 connected to the other movable spring 51, as shown in FIG. 2 for details. So that the armature assembly can drive the two sets of the movable and stationary contacts of the contact system to be closed or separated through the two push cards.

It can be seen from the structure described above that the contact system 5 is provided with two sets of contacts, and each set of the contacts include a movable contact 511 and a stationary contact 521 which are cooperating with each other. Each of the both ends of the armature assembly 31 is connected with a push card 4 through the engagement portion 312, and the movable contacts 511 and the stationary contacts 521 of the two sets of contacts of the contact system 5 are driven to be closed or separated from each other by the two push cards 4, which plays a role in switching on or switching off the circuit.

Figure 5:
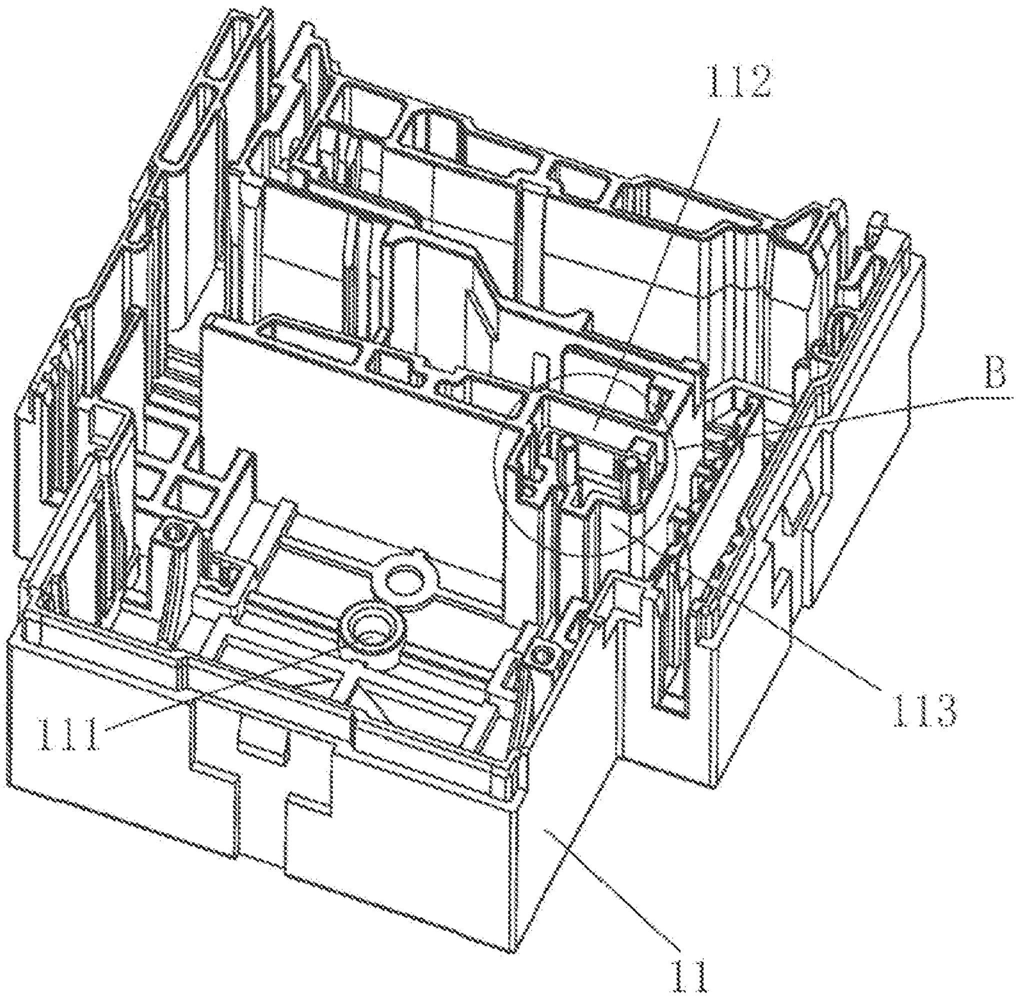
FIG. 5 is a perspective view of a base according to an exemplary embodiment of the present disclosure.
Figure 6:
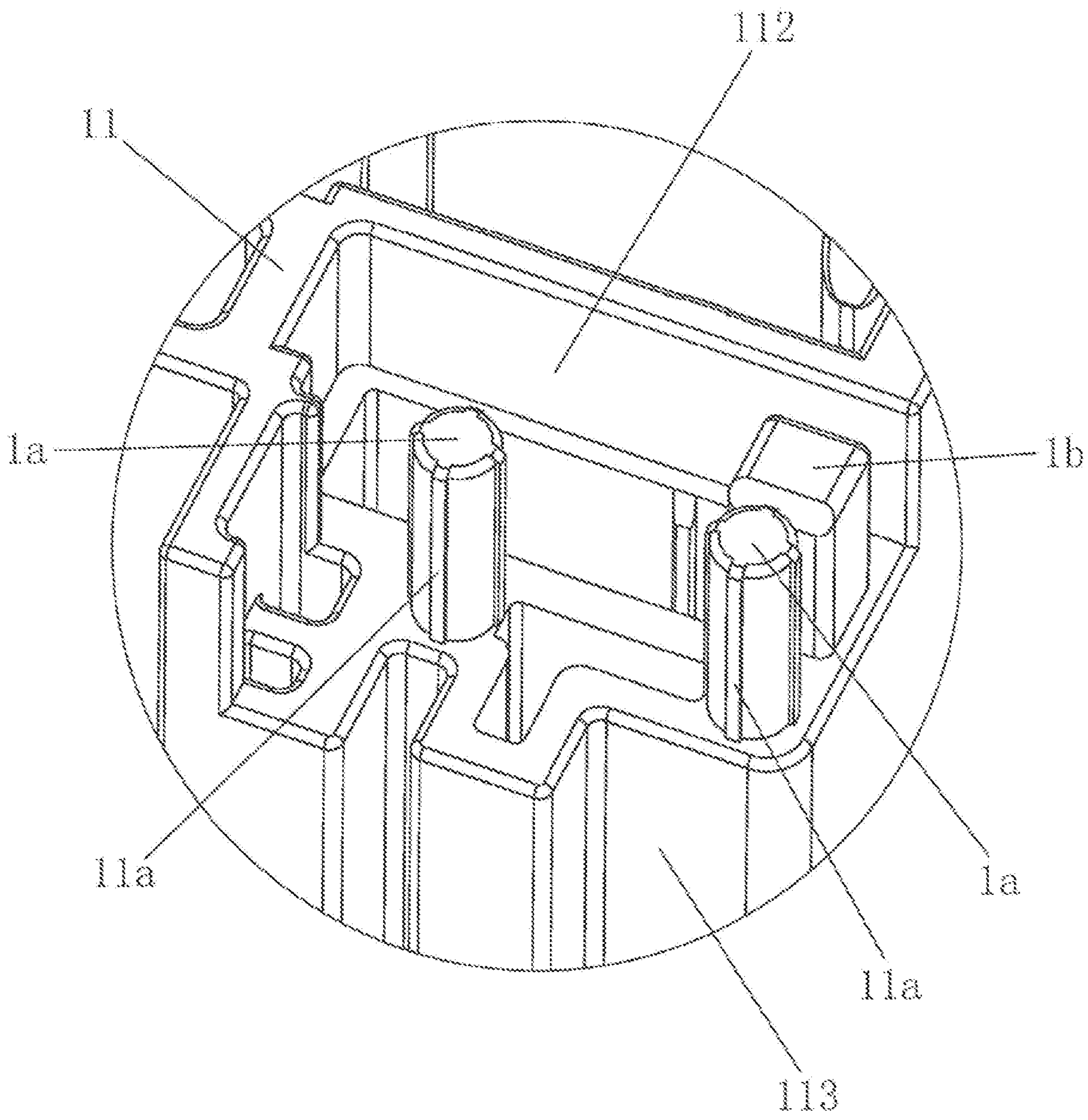
FIG. 6 is an enlarged view of part B of FIG. 5.
Figure 8:
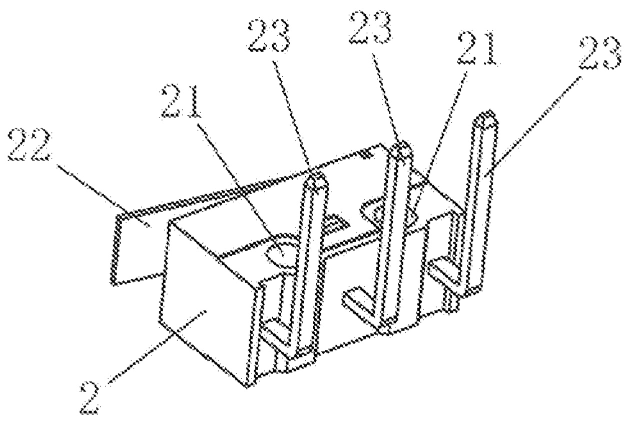
FIG. 8 is a perspective view of a microswitch according to an exemplary embodiment of the present disclosure.

As shown in FIG. 5 and FIG. 6, the base 11 is provided with an assembly zone 112 for accommodating the microswitch 2 at a position close to the armature assembly 31, the housing of the microswitch 2 is configured to abut on the bottom of the assembly zone 112 and is positioned by the assembly zone 112. The bottom of the assembly zone 112 is provided with two positioning posts 1*a*, when the microswitch 2 is installed in the assembly zone 112, each of the positioning posts 1*a* is inserted into an installation hole 21 of the microswitch 2 (as shown in FIG. 8), so that the positioning and the assembly of the microswitch is more convenient; each of the positioning posts 1*a* includes a cylinder, a plurality of positioning protrusions 11*a* protruding radially are provided on the outer peripheral surface of the cylinder at intervals along the circumferential direction of the cylinder, and each of the positioning protrusions 11*a* is in a shape of a strip and is configured to extend along the axial direction of the cylinder, so that it is more convenient for the positioning post 1*a* to be inserted into the installation hole 21 of the microswitch 2 and the fitting accuracy can be ensured. A limit post 1*b* is provided at the bottom of the assembly zone 112 and adjacent to one of the positioning posts 1*a*, the limit post 1*b* is used to limit the movement of the housing of the microswitch 2. Therefore, the tilting, flipping and displacement of the microswitch 2 can be prevented by the limit post 1*b*.

As shown in FIG. 4, when the cover 12 is fixed on the base 11, the cover 12 is pressed on the housing of the microswitch 2. Specifically, the inner side of the cover 12 is provided with a limit rib 121, when the cover 12 is fixed on the base 11, the limit rib 121 is abutted against the housing of the microswitch 2.

As shown in FIG. 6 to FIG. 8, a trigger spring sheet 22 of the microswitch 2 is disposed close to the armature assembly 31, and one end of the armature assembly 31 is provided with a pressure rod 313 extending toward the side where the cover 12 is located, the pressure rod 313 and the two positioning posts 1*a* are parallel to each other. When the armature assembly 31 is rotated, the pressure rod 313 is pressed the trigger spring sheet 22 of the microswitch 2 or released the trigger spring sheet 22 of the microswitch 2.

As shown in FIG. 1 and FIG. 8, the three conductive plug terminals 23 of the microswitch 2 are bent by 90°, and are extended through the cover 12. It is convenient for the installation of the relay and the connection of the conductive plug terminals of the microswitch.

Figure 9:
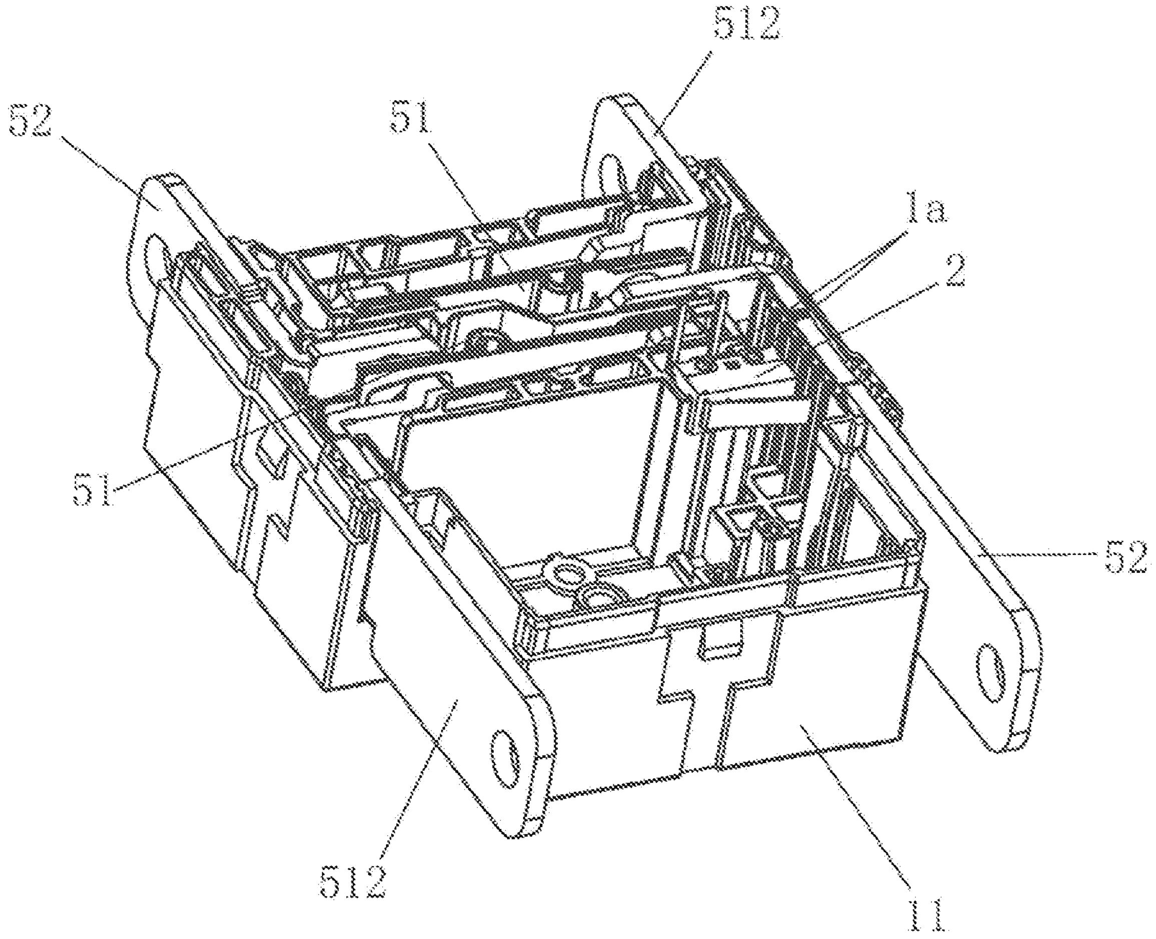
FIG. 9 is a top perspective view of the magnetic latching relay with a cover and a magnetic circuit hidden according to an exemplary embodiment of the present disclosure.
Figure 10:
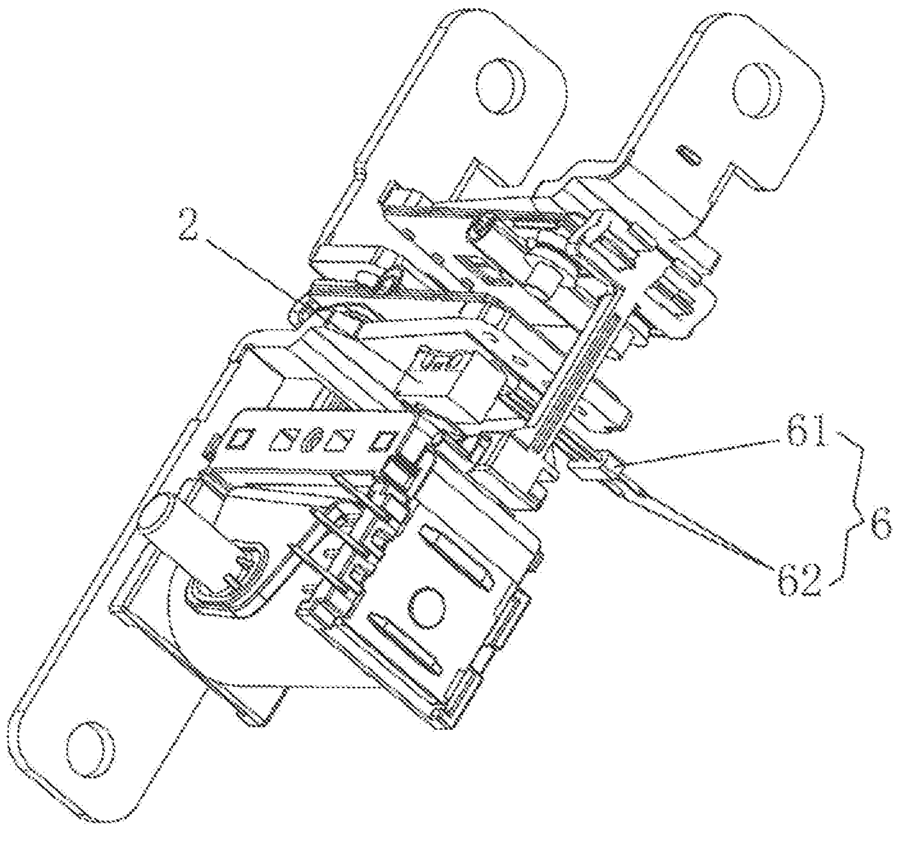
FIG. 10 is a perspective view of the magnetic latching relay with the base, the cover and a stationary spring hidden according to an exemplary embodiment of the present disclosure.
Figure 11:
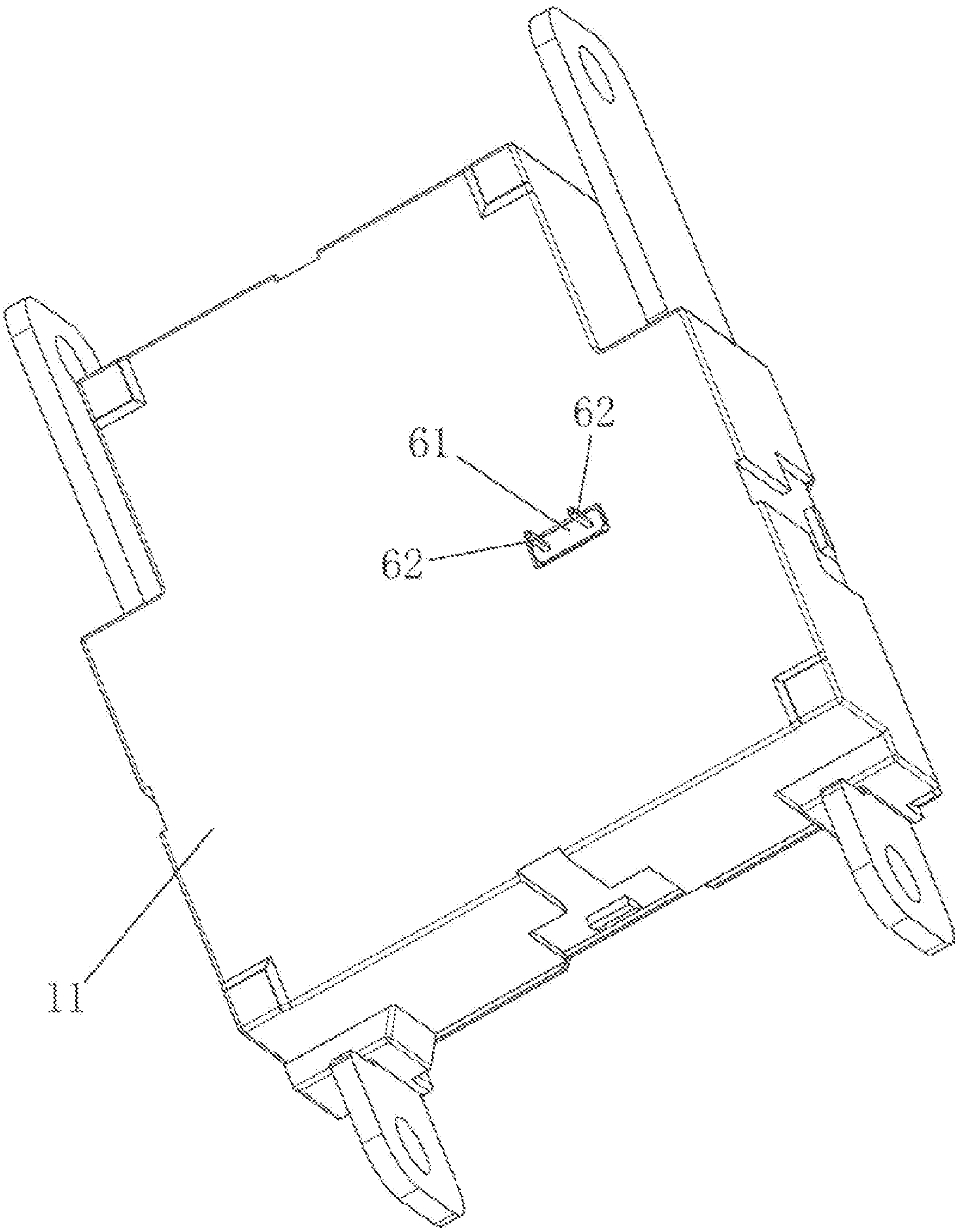
FIG. 11 is a bottom perspective view of the magnetic latching relay with the cover hidden according to an exemplary embodiment of the present disclosure.

Further combined with FIG. 2, FIG. 7 and FIG. 9, the portion of the housing of the microswitch 2 at the side close to the armature assembly 31 is suspended, the space below the suspended portion of the housing of the microswitch 2 gives way to the movement of the armature assembly 31 and the push card 4, the distance between the bottom surface of the housing of the microswitch 2 and the bottom surface of the base 11 is greater than the distance between the upper surface of the end portion of the push card 4 connected to the armature assembly 31 and the bottom surface of the base 11, so that one end of the push card 4 will not interfere with the microswitch 2 when the push card 4 is moving to facilitate the microswitch to give way and the arrangement of the push card and make the structure further compact. The bottom of the assembly zone 112 is formed by the upper end surface of a convex block 113, a side of the convex block 113 close to the armature assembly 31 is arranged as a stepped structure, which can give way to the movement of the armature assembly 31 and the push card 4 easily, so that the overall structure is more compact.

One end of the armature assembly 31 is provided with a support part 314, and the support part 314 is configured to extend to the side away from the microswitch 2, the pressure rod 313 is disposed on one end of the support part 314 away from the microswitch 2. So that the microswitch 2 can be arranged closer to the armature assembly 31 and the structure is more compact, and is better for giving way to the microswitch.

When the armature assembly 31 in this embodiment is rotated counterclockwise, the movable contact 511 and the stationary contact 521 in each of the two sets of contacts of the contact system 5 are separated from each other; the pressure rod 313 is pressed the trigger spring sheet 22 of the microswitch 2 to make the microswitch 2 act, and the microswitch 2 transmits its one state to the outside through the conductive plug terminals 23; when the armature assembly 31 in this embodiment is rotated clockwise, the movable contact 511 and the stationary contact 521 in each of the two sets of contacts of the contact system 5 are in contact with each other, the pressure rod 313 is released the trigger spring sheet 22 of the microswitch 2, and the microswitch 2 also transmits its other state to the outside through the conductive plug terminal 23; in this way, the working state of the relay can be easily judged by judging the state of the microswitch 2.

As shown in FIG. 10 to FIG. 13, a magnetic latching relay with a microswitch is also provided, which differs from the embodiments described above in that: the microswitch 2 is provided with two conductive plug terminals 23, and the two conductive plug terminals 23 of the microswitch 2 are bent by 90° and are extended through the base 11 from its bottom. In order to reduce the cost of the microswitch and at the same time ensure that the two conductive plug terminals 23 of the microswitch 2 can be extended through the base 11 from its bottom, a component 6 for terminal extension is fixedly connected to the two conductive plug terminals 23, the component 6 for terminal extension includes an I-shaped frame 61, and both ends of the I-shaped frame 61 are insulators, two conductive extension pins 62 arranged at intervals are provided and are configured to extend through both ends of the I-shaped frame 61, the two conductive plug terminals 23 of the microswitch 2 are inserted into one end of the I-shaped frame 61 at intervals, each conductive plug terminal 23 of the microswitch 2 is in contact with one conductive extension pin 62.

Figure 12:
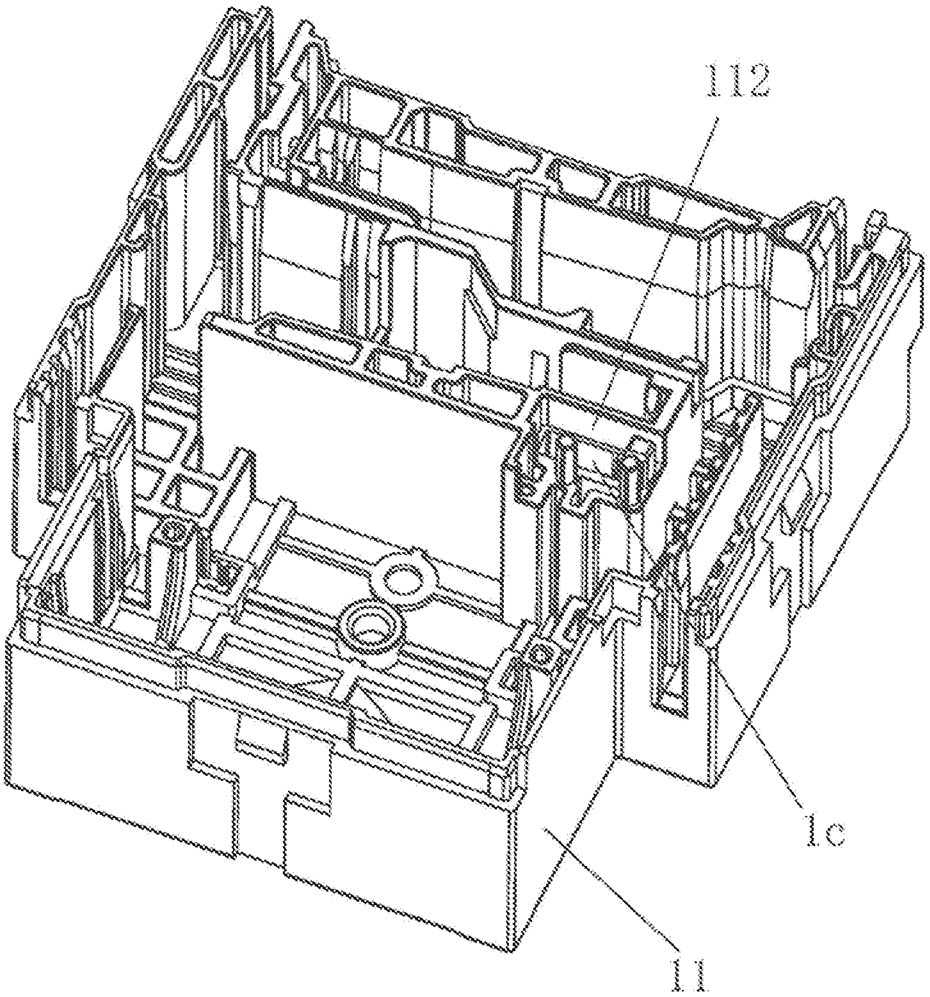
FIG. 12 is a top perspective view of the base according to an exemplary embodiment of the present disclosure.
Figure 13:
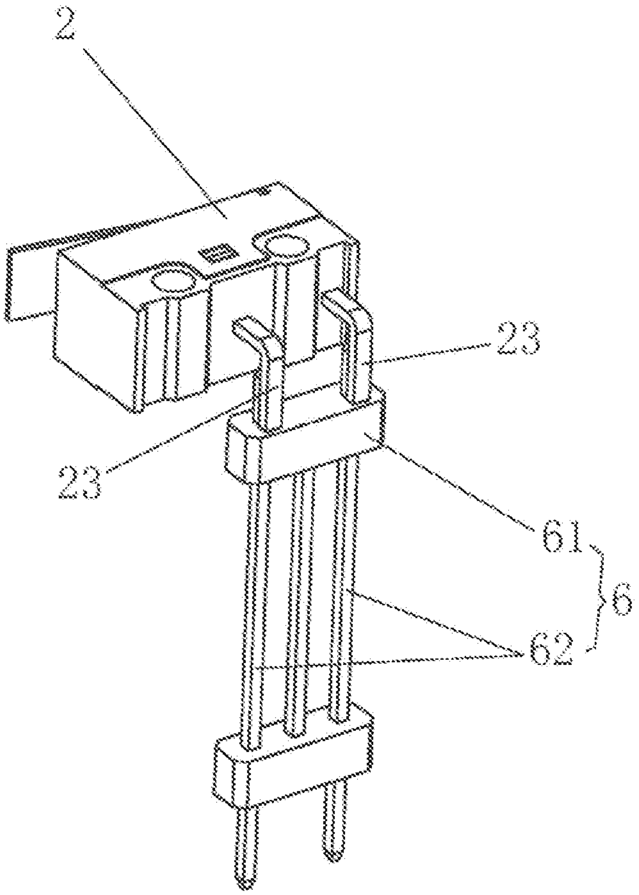
FIG. 13 is a perspective view of the connection between the microswitch and the component for terminal extension according to another exemplary embodiment of the present disclosure.

As shown in FIG. 12, the base 11 is provided with a through hole 1*c* at the bottom of the assembly zone 112, the through hole 1*c* is penetrated through the bottom of the base 11, the I-shaped frame 61 is embedded in the through hole 1*c*, and one end of each of the two conductive extension pins 62 is extended through the base 11.

In the present disclosure, the base is provided with an assembly zone for accommodating the microswitch at a position close to the armature assembly, the housing of the microswitch is configured to abut on the bottom of the assembly zone and is positioned by the assembly zone, the portion of the housing of the microswitch at the side close to the armature assembly is suspended, the space below the suspended portion of the housing of the microswitch gives way to the movement of the armature assembly and/or the push card, when the cover is fixed on the base, the cover is pressed the housing of the microswitch; one end of the armature assembly is provided with a pressure rod extending toward the side where the cover is located, when the armature assembly rotates, the pressure rod is pressed the trigger spring sheet of the microswitch or released the rigger spring sheet of the microswitch. In this way, on the one hand, the microswitch can be arranged closer to the armature assembly to make full use of the remaining space on the base, so that the overall structure of the relay is compact, and the magnetic latching relay after adding a microswitch is smaller in size; on the other hand, the housing of the microswitch is abutted on the bottom of the assembly zone and is positioned through the assembly zone, and the cover is pressed the housing of the microswitch, so that it is convenient for the manipulator to grasp the microswitch and the cover for assembly, which facilitates the automatic assembly of the microswitch and reduce the manufacturing cost.

The above are only exemplary embodiments of the present disclosure, and changes made by those skilled in the art make equivalent according to the claims will all fall into the protection scope of this application.

What is claimed is:

1. A magnetic latching relay with a microswitch, comprising an insulation case and a microswitch, wherein the insulation case is formed by a base and a cover being fixedly connected, a magnetic circuit system, a push card and a contact system are installed on the base; the magnetic circuit system comprising an armature assembly, wherein a middle portion of the armature assembly is pivotally connected to the base; the contact system comprising a movable contact and a stationary contact, wherein the armature assembly is connected with the push card, and the armature assembly is configured to drive the movable contact of the contact system through the push card to make the movable contact and the stationary contact be closed or separated from each other; wherein:

the base is provided with an assembly zone for accommodating the microswitch at a position close to the armature assembly, a housing of the microswitch is configured to abut on a bottom of the assembly zone and be positioned by the assembly zone, a portion of the housing of the microswitch at a side close to the armature assembly is suspended, a space below the portion of the housing of the microswitch suspended is configured to give way to a movement of at least one the armature assembly and the push card, the cover is fixed on the base, and the cover is configured to press the housing of the microswitch;

one end of the armature assembly is provided with a pressure rod extending toward a side where the cover is located, and the pressure rod is configured to press a trigger spring sheet of the microswitch or release the trigger spring sheet of the microswitch in case that the armature assembly is rotated.

2. The magnetic latching relay according to claim 1, wherein the bottom of the assembly zone is provided with two positioning posts, the microswitch is installed in the assembly zone, each of the positioning posts is inserted into an installation hole of the microswitch; the two positioning posts and the pressure rod are parallel to each other.

3. The magnetic latching relay according to claim 2, wherein each of the positioning posts comprises a cylinder, a plurality of positioning protrusions protruding radially are provided on an outer peripheral surface of the cylinder at intervals along a circumferential direction of the cylinder, and each of the positioning protrusions is in a shape of a strip and is configured to extend along an axial direction of the cylinder.

4. The magnetic latching relay according to claim 2, wherein a limit post for limiting a movement of the housing of the microswitch is provided at the bottom of the assembly zone and adjacent to one of the positioning posts.

5. The magnetic latching relay according to claim 1, wherein a distance between a bottom surface of the housing of the microswitch and a bottom surface of the base is greater than a distance between an upper surface of an end portion of the push card connected to the armature assembly and the bottom surface of the base, so that one end of the push card is prevented from interfering with the microswitch during a movement of the push card.

6. The magnetic latching relay according to claim 1, wherein the bottom of the assembly zone is formed by an upper end surface of a convex block, and a side of the convex block close to the armature assembly is arranged as a stepped structure.

7. The magnetic latching relay according to claim 1, wherein an inner side of the cover is provided with a limit rib, the cover is fixed on the base, and the limit rib is pressed the housing of the microswitch.

8. The magnetic latching relay according to claim 1, wherein a plurality of conductive plug terminals of the microswitch are bent, and are extended through the cover, or extended through the base from a bottom.

9. The magnetic latching relay according to claim 8, wherein in case that the plurality of conductive plug terminals of the microswitch are bent and are extended through the base from the bottom, the conductive plug terminals are fixedly connected with a component for terminal extension, the component for terminal extension comprises an I-shaped frame, and both ends of the I-shaped frame are insulators, a plurality of conductive extension pins arranged at intervals are provided and are configured to extend through both ends of the I-shaped frame, the plurality of conductive plug terminals of the microswitch are inserted into one end of the I-shaped frame at intervals, each of the conductive plug terminals of the microswitch is in contact with one of the conductive extension pins;

the base is provided with a through hole at the bottom of the assembly zone, the through hole is penetrated through the bottom of the base, the I-shaped frame is embedded in the through hole, and one end of each of the plurality of conductive extension pins is extended through the base.

10. The magnetic latching relay according to claim 1, wherein the contact system comprises two movable springs and two stationary springs, each of the movable springs is provided with the movable contact, and each of the stationary springs is provided with the stationary contact; there are two push cards, one end of each of the push cards is provided with a slot, each of the push cards is provided with a fitting hole which is under the slot, both ends of the armature assembly are provided with an engagement portion respectively, each engagement portion is fitted with the slot at one end of one push card and inserted into the fitting hole, another end of each of the push cards is connected to one end of one of the movable springs, another end of each of the movable springs are connected to a conductive lead-out pin.

11. The magnetic latching relay according to claim 1, wherein one end of the armature assembly is provided with a support part, and the support part is configured to extend to a side away from the microswitch, the pressure rod is disposed on one end of the support part away from the microswitch.

12. The magnetic latching relay according to claim 2, wherein one end of the armature assembly is provided with a support part, and the support part is configured to extend to a side away from the microswitch, the pressure rod is disposed on one end of the support part away from the microswitch.

13. The magnetic latching relay according to claim 3, wherein one end of the armature assembly is provided with a support part, and the support part is configured to extend to a side away from the microswitch, the pressure rod is disposed on one end of the support part away from the microswitch.

14. The magnetic latching relay according to claim 4, wherein one end of the armature assembly is provided with a support part, and the support part is configured to extend to a side away from the microswitch, the pressure rod is disposed on one end of the support part away from the microswitch.

15. The magnetic latching relay according to claim 5, wherein one end of the armature assembly is provided with a support part, and the support part is configured to extend to a side away from the microswitch, the pressure rod is disposed on one end of the support part away from the microswitch.

16. The magnetic latching relay according to claim 6, wherein one end of the armature assembly is provided with a support part, and the support part is configured to extend to a side away from the microswitch, the pressure rod is disposed on one end of the support part away from the microswitch.

17. The magnetic latching relay according to claim 7, wherein one end of the armature assembly is provided with a support part, and the support part is configured to extend to a side away from the microswitch, the pressure rod is disposed on one end of the support part away from the microswitch.

18. The magnetic latching relay according to claim 8, wherein one end of the armature assembly is provided with a support part, and the support part is configured to extend to a side away from the microswitch, the pressure rod is disposed on one end of the support part away from the microswitch.

19. The magnetic latching relay according to claim 9, wherein one end of the armature assembly is provided with a support part, and the support part is configured to extend to a side away from the microswitch, the pressure rod is disposed on one end of the support part away from the microswitch.

20. The magnetic latching relay according to claim 10, wherein one end of the armature assembly is provided with a support part, and the support part is configured to extend to a side away from the microswitch, the pressure rod is disposed on one end of the support part away from the microswitch.

* * * * *